United States Patent
Hu et al.

(10) Patent No.: US 9,716,458 B2
(45) Date of Patent: Jul. 25, 2017

(54) MULTI-MOTOR DRIVING DEVICE AND METHOD FOR DRIVING SAME

(71) Applicants: Xiaofei Hu, Shenzhen (CN); Hongxing Wang, Shenzhen (CN); Yao Wang, Shenzhen (CN)

(72) Inventors: Xiaofei Hu, Shenzhen (CN); Hongxing Wang, Shenzhen (CN); Yao Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 15/228,146

(22) Filed: Aug. 4, 2016

(65) Prior Publication Data

US 2017/0104434 A1 Apr. 13, 2017

(30) Foreign Application Priority Data

Oct. 9, 2015 (CN) .......................... 2015 1 0650287

(51) Int. Cl.
*H02K 33/00* (2006.01)
*H02P 25/032* (2016.01)

(52) U.S. Cl.
CPC .................................. *H02P 25/032* (2016.02)

(58) Field of Classification Search
CPC .......... H02K 33/00; H02K 35/00; H02P 3/00; H02P 5/00; H02P 1/54; H02P 1/56; H02P 1/58; H02P 7/00; H02P 8/00; H02P 1/18

USPC ...... 318/400.01, 400.14, 700, 432, 599, 114, 318/34, 625; 340/582; 335/90; 363/110

See application file for complete search history.

(56) References Cited

U.S. PATENT DOCUMENTS

2012/0046579 A1 * 2/2012 Radl .................. A61H 11/00
601/46

* cited by examiner

*Primary Examiner* — Antony M Paul
(74) *Attorney, Agent, or Firm* — Na Xu; IPro, PLLC

(57) ABSTRACT

The invention provides a multi-motor driving device and a method. The device includes an event generation system, a motor system and control system which includes multiple motors, an initial signal issued by the event generation system when an event is generated. The control system includes a control module, a motor selection module, a signal selection module and a driving module. The control module receives initial signal then outputs a motor selection instruction and a signal selection instruction. The motor selection module selects motor control signal of the motor according to the motor selection instruction exported by the control module. The signal selection module exports vibration signal according to signal selection instruction exported by the control module. This disclosure can select a certain motor or multiple motors to vibrate according to actual requirement.

9 Claims, 2 Drawing Sheets

MULTI-MOTOR DRIVING DEVICE AND METHOD FOR DRIVING SAME

FIELD OF THE INVENTION

The present disclosure is related to vibration motors, specifically related to a multi-motor driving device and a method for driving the device.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

In existing technology, the mostly only one motor is used. When there is only one motor, it's only needed to simply consider whether this motor is vibrated or not. But with the increasing requirement, it's inevitable that to use multiple motors in one vibration motor. Thus, it's needed to consider whether all the motors shall vibrate together or which motor shall vibrate at a certain time. Then the problem becomes complicated. We can achieve better vibration effect after solving this problem.

Therefore, an improved multi-motor driving device and its driving method which can overcome the problems mentioned above are accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
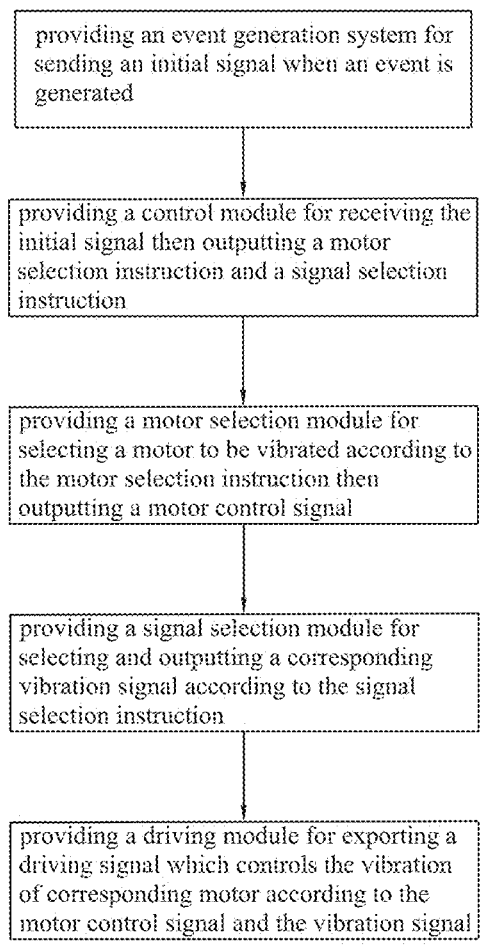
FIG. 1 is a flow chart of a driving method for a multi-motor driving device in accordance with an exemplary embodiment of the present disclosure.
Figure 2:
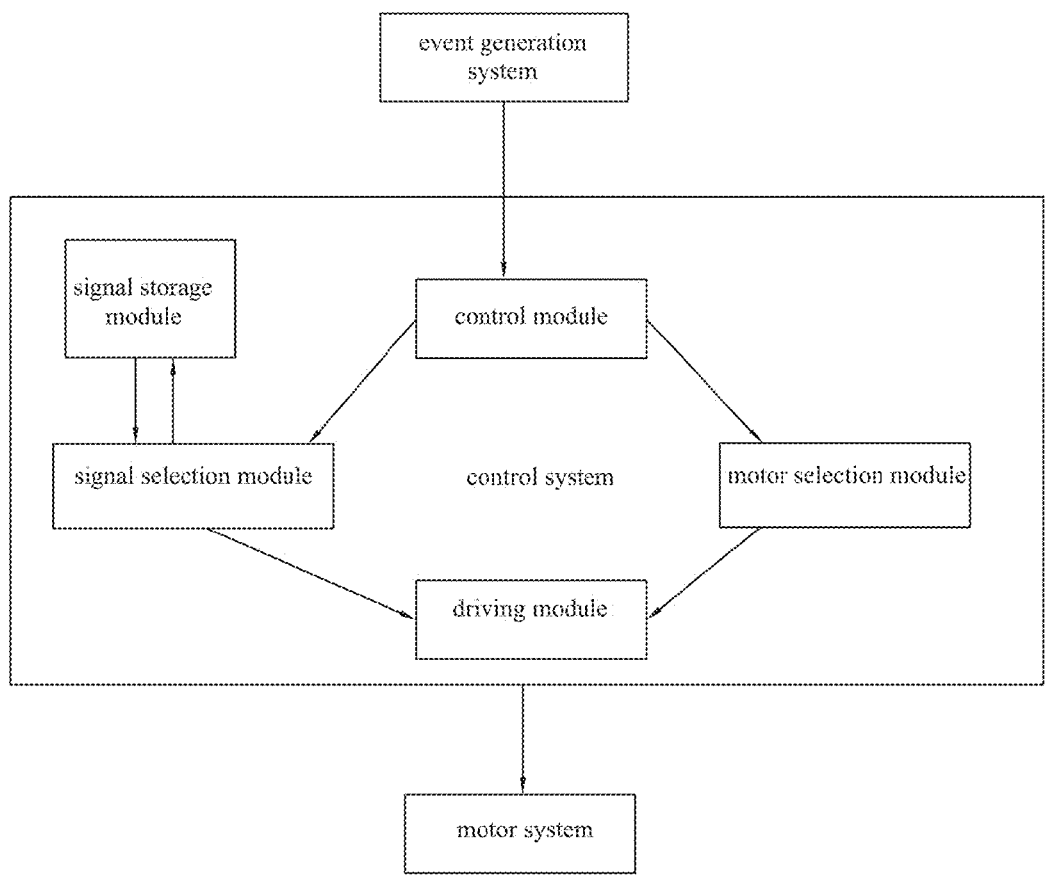
FIG. 2 is an illustrative diagram of the multi-motor driving device.

Referring to FIGS. 1-2, a multi motor driving device which can perform motor selection control is disclosed. The device includes an event generation system, a control system and a motor system.

The event generation system sends initial signal when the event or request is generated. This initial signal includes all information of this event or request. The event may be the alarm time or calendar reminder which is not an event of immediate operation. The event may also be immediate operation such as a user presses a certain application or open a video or a game's immediate operation, or may also be the non-human event triggered from a scene in the video.

The control system includes a control module, a motor selection module, a signal storage module and a driving module.

When the initial signal exported by event generation system reaches the control system, the control module is used for receiving the initial signal sent by the event generation system and analyses the initial signal, then extracting the needed signal and exporting the motor selective command and the signal selective command.

The motor selection module exports a motor control signal of a selected motor to be vibrated according to a motor selection instruction sent from the control module. The different motor control signals can control the vibration of a motor or multiple motors, or control the vibration of a certain motor from multiple motors.

The signal storage module includes a number of preset signals. Different preset signals can achieve different vibrations, such as duration and amplitude of vibration.

The signal selection module is used to select corresponding preset signals from the signal storage module according to the signal selection instruction sent by the control module. The signals may be the same, also may be different from corresponding different motors. The extracted preset signals will be feedback to signal selection module as vibration signal.

The driving module is used to receive the vibration signal sent from the signal selection module and the motor control signal exported from motor selection module. It will amplify the signal, and export an driving signal which can drive corresponding motor to vibrate. The driving module can include one drive module to drive multiple motor to vibrate. Also, it can include multiple drive sub-modules to drive different motors to vibrate respectively.

The motor system includes multiple motors which are linked to the driving modules. The motor system receives the drive signals exported by the driving module to trigger corresponding motor to run. Due to existence of motor selection module, the number and location of vibrating motors are uncertain.

Optionally, multiple driving modules are provided for driving the multiple motors respectively.

Meanwhile, a method for motor selection control is also provided in this disclosure. The method includes the steps of:

S1: The even generation system sends out initial signal when event is generated;

S2: The control module receives the above mentioned initial signal and analyzes it, exports the motor selection instruction and the signal selection instruction;

S3: The motor selection module selects motor which is to be vibrated according to the above mentioned motor selection instruction, and exports the motor selection signal.

S4: The signal selection module selects and exports corresponding vibration signal according to the above mentioned signal selection instruction S5: The driving module exports driving signal which controls the vibration of corresponding motor according to the motor control signal and the vibration signal.

To better to understand the technical scheme of this invention, the control method of the driving device is described as follows with more specific example. When there is only one motor vibrating, for example, when event A—alarm clock reaches the alarming time—is generated, the event generation system sends an initial signal, control module in control system receives the initial signal and analyses it then export motor selection instruction to motor selection module. At this time motor selection module export motor control system which control a motor to vibrate. At same time, the signal exported by control module let signal selection module select corresponding preset signal from the signal storage module as vibration signal. The driving module receives the passed vibration signal and motor control signal then amplify the signal, and export the driving signal to motor system, this way one motor in the motor driving system is driven to vibrate.

When there are multiple motors vibrating, for example, when encountering obstacles in a racing game, multiple motors vibration can bring abundant and strong vibration effect. When event B—the encounter of obstacles—is occurring, the event generation system send an initial signal, control module in control system receives the initial signal and analyses it then export motor selection instruction to motor selection module. At this time motor selection module export motor control system which control multiple motors to vibrate. At same time, the signal exported by control module let signal selection module select corresponding preset signal from the signal storage module as vibration signal. The driving module receives the passed vibration signal and motor control signal then amplify the signal, and export the driving signal to motor system, this way multiple motors in the motor driving system are driven to vibrate. For example, vibration in even or uneven vibration sense can be generated according to same or different phase of the input signal The invention discloses a multi motor driving device which can perform motor selection control. It can trigger vibration for one or multiple motors, which brings abundant effects.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-motor driving device, comprising:
   an event generation system for sending initial signals when the event is generated;
   a motor system including multiple motors;
   a control system including:
   a control module for receiving the initial signal sent by the event generation system then outputting a motor selection instruction and a signal selection instruction;
   a motor selection module for selecting a motor control signal of the motor to be vibrated according to the motor selection instruction outputted by control module;
   a signal selection module for outputting a corresponding vibration signal according to the signal selection instruction sent by the control module;
   a driving module for receiving the vibration signal outputted by signal selection module and the motor control signal outputted by the motor selection module, then outputting a driving signal to the motor to be vibrated.

2. The multi-motor driving device as described in claim 1, wherein the control system further includes a signal storage module which includes a number of preset signals, the signal selection module selects corresponding preset signal as a vibration signal from the signal storage module.

3. The multi-motor driving device as described in claim 1, wherein the motor selection module selects one or multiple motors to be vibrated according to the motor selection instruction exported by the control module.

4. The multi-motor driving device as described in claim 3, wherein the motor selection module selects a certain one or multiple motors to be vibrated according to the motor selection instruction exported by the control module.

5. The multi-motor driving device as described in claim 1, wherein a plurality of driving modules are used to drive several motors.

6. A method for driving the multi-motor driving device as described in claim 1, comprising the steps of:
   S1: providing an event generation system for sending an initial signal when an event is generated;
   S2: providing a control module for receiving the initial signal then outputting a motor selection instruction and a signal selection instruction;
   S3: providing a motor selection module for selecting a motor to be vibrated according to the motor selection instruction then outputting a motor control signal;
   S4: providing a signal selection module for selecting and outputting a corresponding vibration signal according to the signal selection instruction;
   S5: providing a driving module for exporting a driving signal which controls the vibration of corresponding motor according to the motor control signal and the vibration signal.

7. The method as described in claim 6, wherein in S4, the signal selection module selects a corresponding preset signals as vibration signal from a number of preset signals in a signal storage module according to the signal selection instruction.

8. The method as described in claim 6, wherein one or multiple motors to be vibrated are selected according to the motor selection instruction.

9. The method as described in claim 6, wherein a certain one or multiple motors from multiple motors to be vibrated is selected according to the motor selection instruction.

* * * * *